United States Patent [19]
How

[11] Patent Number: 6,047,024
[45] Date of Patent: Apr. 4, 2000

[54] DEVICE FOR EQUALIZING CHANNEL-DISTORTED SIGNALS

[75] Inventor: Stephen K. How, San Diego, Calif.

[73] Assignee: Alcatel Internetworking, Inc., Calabasas, Calif.

[21] Appl. No.: 08/918,544

[22] Filed: Aug. 22, 1997

[51] Int. Cl.[7] ...................................................... H03H 7/30
[52] U.S. Cl. .............................. 375/229; 375/232; 333/18
[58] Field of Search .................................... 375/229, 230, 375/232, 233, 345; 333/18; 381/98, 103

[56] References Cited

U.S. PATENT DOCUMENTS

| | | | |
|---|---|---|---|
| 4,251,782 | 2/1981 | Bynum . | |
| 4,583,235 | 4/1986 | Domer . | |
| 4,823,339 | 4/1989 | Bigo et al. .............................. | 370/32.1 |
| 5,067,137 | 11/1991 | Kaneko ...................................... | 375/14 |
| 5,305,351 | 4/1994 | Mizoguchi .................................. | 375/14 |
| 5,455,843 | 10/1995 | Cherubini . | |
| 5,519,727 | 5/1996 | Okanoue et al. ......................... | 375/232 |
| 5,880,645 | 3/1999 | Everitt et al. .............................. | 333/18 |
| 5,923,708 | 7/1999 | Mutoh ...................................... | 375/233 |

*Primary Examiner*—Stephen Chin
*Assistant Examiner*—Mohammad Ghayour
*Attorney, Agent, or Firm*—Scot A. Reader, Esq.

[57] ABSTRACT

An equalization device has a digital equalizer for joint tuning of a data-carrying signal distorted by analog transmission. The digital equalizer includes a closed-loop automatic gain control (AGC) circuit for applying a compensatory frequency-independent gain to the distorted signal followed by a frequency filter for applying a compensatory frequency-dependent gain to the signal. Joint tuning produces an output signal which more closely resembles the originally transmitted signal, facilitating recovery of implicit clock and more reliable data recovery. The digital equalizer may be advantageously stage-implemented as a preliminary digital equalizer which is preceded by an analog equalizer and followed by a final digital equalizer.

26 Claims, 4 Drawing Sheets

DEVICE FOR EQUALIZING CHANNEL-DISTORTED SIGNALS

FIELD OF THE INVENTION

The present invention relates to devices for improving the quality of data-carrying signals and, more particularly, to devices for improving the quality of data-carrying signals severely distorted by transmission in analog form over a long or unknown length of cable.

BACKGROUND OF THE INVENTION

In data communication networks, nodes often communicate by transmitting data bits as analog waveforms over a cable, commonly an unshielded twisted pair (UTP) or shielded twisted pair (STP) cable. A receiver is generally implemented at the receiving node to recover the digital data bits from the analog signal. Because analog signals transmitted over such links are often low in power and radiation, and because of cable tolerances, such signals are often obscured upon arrival at the receiver. The distortion is particularly problematic where the signal is transmitted over a long length of cable at a high frequency or in a multi-level symbol alphabet, such as MLT-3. If left uncorrected, such distortion often renders recovery of the implicit clock impossible and can cause either a total inability to recover the transmitted data, or recovery of data with an unacceptably high incidence of bit errors. Therefore, it is often necessary to improve the quality of the signal before attempting clock or data recovery. Signal quality is typically improved through a process known as equalization which, generally speaking, compensates for distortions and reshapes the signal closer to its original waveform.

The equalization process can present technical challenges because the nature and extent of distortions introduced in data-carrying channels varies from network-to-network and link-to-link. The nature of channel-introduced distortions can be affected by numerous factors, including channel length, transmission frequency and, to a generally lesser extent, impediments in connectors and coupling transformers, manufacturing variations and environmental factors such as temperature. Additional complications arise from the dependence of some distortion-causing variables on others, such as the frequency dependency of signal attenuation for a given channel length. This particular interdependence is modeled by the well-known "square root" attenuation model shown graphically for Category 5 UTP cable in FIG. 1.

Because the distortion-causing factors at work can vary considerably, fixed or static equalization techniques have proven of limited value in correcting distortions introduced in some kinds of data-carrying channels, such as UTP and STP channels. An alternative technique known as adaptive equalization has proven more useful in correcting such distortions. Known adaptive equalizers have implemented equalization techniques, often decision-directed least mean square (LMS) error techniques, which are self-optimizing over one or more variables, such as channel length. Various adaptive equalization techniques have been developed. See, e.g., Honing and Messerschmidt, Adaptive Filters: Structures, Algorithms and Applications; Widrow, Adaptive Filtering; Domer, U.S. Pat. No. 4,583,235; Cherubini, U.S. Pat. No. 5,455,843. While known adaptive equalizers have proven useful tools for improving the resolution of signals transmitted over UTP and STP channels, they have usually been inadequate, especially when applied as the sole equalization source, to enable reliable data recovery in high performance data communication networks. For instance, it is well known that non-fractionally spaced adaptive equalizers are sensitive to baud sampling phase. The distortions introduced in UTP and STP channels, especially at the longer cable lengths, have resulted in signals with a level of inter-symbol interference (ISI) so large that adaptive equalizers have often been unable, acting alone, to process them accurately enough to enable consistent low bit error data recovery. Accordingly, there is a need in the high performance data communication networking field for improved equalization techniques for reforming signals severely distorted by analog transmission over cable, particularly over long or unknown lengths of UTP or STP cable.

SUMMARY OF THE INVENTION

In its most basic feature, the present invention provides a novel self-adjusting equalization device which includes a digital equalizer for performing a joint-tuned adjustment of a channel-distorted data-carrying signal. In one aspect of the invention, the equalizer includes a closed-loop automatic gain control (AGC) circuit for applying a compensatory frequency-independent gain to a data-carrying signal followed by a finite impulse response (FIR) filter for applying a compensatory frequency-dependent gain to the signal. The gains applied by the AGC circuit and FIR filter have different gain characteristics but are each dependent on a estimated signal level generated by sampling the data-carrying signal at a single point on the signal path. This dual signal tuning based on a common estimate, or joint tuning, yields an output signal that more closely resembles the originally transmitted signal than did the severely distorted signal which arrived at the equalizer.

In operation, the AGC circuit samples the data-carrying signal and applies a frequency-independent gain to the signal in a closed-loop system in which the internal error metric is driven toward zero. An aggregate of signal samples are subjected to a memoriless non-linear transfer function which returns an estimated signal level. The estimated signal level is compared with a target signal level to generate a gain error signal. The gain error signal is filtered in the generation of an AGC gain signal. The AGC gain signal is applied in feedback to the data-carrying signal to complete the loop. The AGC circuit thereby continuously performs a frequency-independent modification of the data-carrying signal to bring the signal close to the target signal level. The gain-adjusted data-carrying signal proceeds to a FIR filter which applies a frequency-dependent gain to the signal in open-loop. The signal flows into the FIR filter, to which a coefficient signal related mathematically to the AGC gain signal is applied separately. The FIR filter subjects the gain-adjusted data-carrying signal to a frequency response shaped by the coefficient signal. The FIR filter returns an output signal which, due to the joint tuning, roughly approximates the original signal waveform generated at the transmitting node. More reliable clock recovery and data recovery is thereby enabled.

In another aspect of the invention, the digital equalizer is employed in a larger stage-implemented equalization device as a digital preliminary equalizer, or digital pre-equalizer, which provides preliminarily processing of the data-carrying signal to eliminate severe channel-introduced distortions before the signal is subjected to other processing elements for clock recovery and final equalization. Such pre-processing restores the signal to a form which roughly resembles its originally transmitted form so that clock recovery and final equalization by other processing elements can proceed more effectively. In the stage-implemented equalization device, the digital pre-equalizer is preceded by an analog preliminary equalizer, or analog pre-equalizer, which provides a very rough reshaping of the severely distorted data-carrying signal. The analog pre-equalizer subjects the signal to a frequency response that has the effect of making the signal appear to subsequent processing circuits as if it had been transmitted over a cable shorter than the actual length of the cable over which the signal was transmitted. The digital pre-equalizer is followed by a final digital equalizer which subjects the signal to a final, decision-directed frequency response designed to minimize LMS error. The final digital equalizer returns a final signal which closely resembles the original signal waveform generated at the transmitting node, enabling data recovery to proceed more reliably.

These and other aspects of the invention can be understood by reference to the following detailed description, taken in conjunction with the accompanying drawings, which are briefly described below. Of course, the actual scope of the invention is defined by the appended claims.

DETAILED DESCRIPTION OF THE PREFERRED EMBODIMENT

Figure 2:
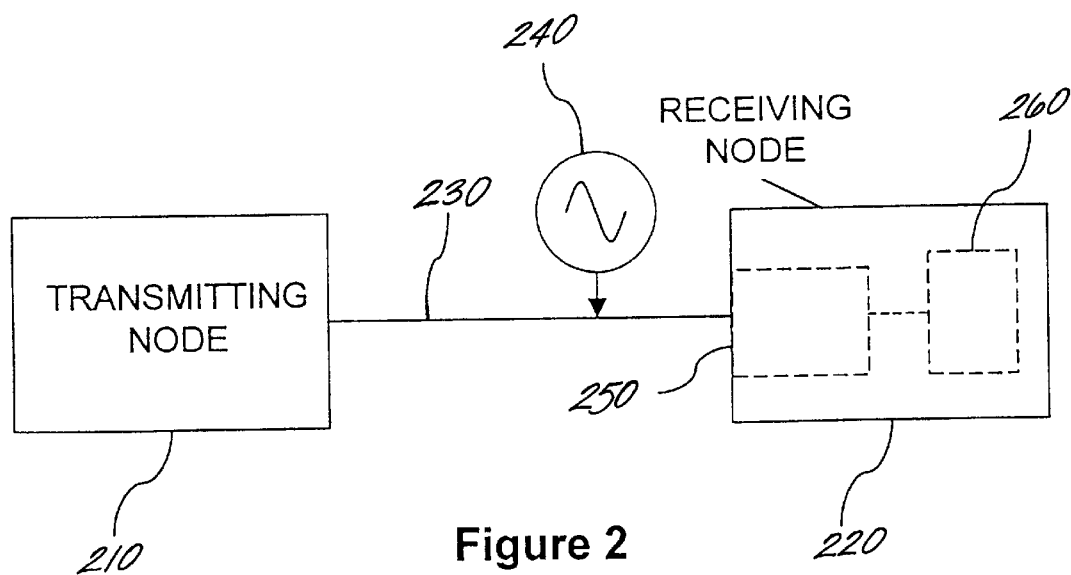
FIG. 2 is a generalized block diagram of a transmitting node and a receiving node interoperative with the present invention.

Turning now to the drawings, and more particularly to FIG. 2, nodes 210, 220 in a data communication network are interconnected by cable 230. Nodes 210, 220 are devices operative for communicating by transmitting a data-carrying signal 240 over cable 230. Nodes are data communication networking elements, such as switches, bridges, hubs, repeaters, servers, workstations and personal computers. Cable 230 is a communication medium, such as Category 3 or Category 5 UTP or STP cable, for transmitting data-carrying signal 240 between nodes 210, 220. Receiving node 220 has signal-adjusting elements 250 for improving the quality of signal 240 and has signal-interpreting elements 260 for interpreting signal 240. Transmitting node 210 may also include receiving capabilities, while receiving node 220 may also include transmitting capabilities.

Figure 1:
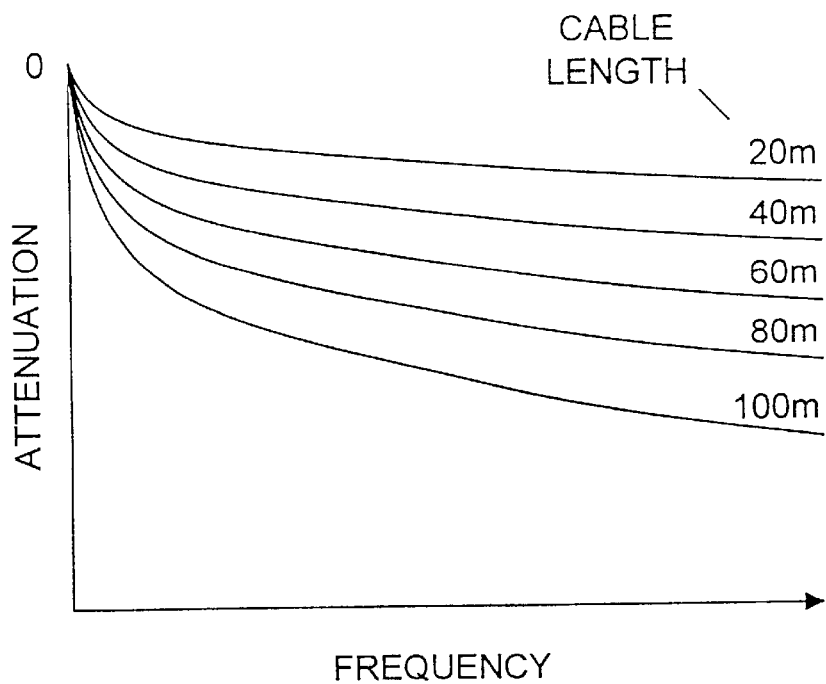
FIG. 1 is a graph illustrating the general dependence of signal attenuation on signal frequency and cable length for Category 5 UTP cable.
Figure 3:
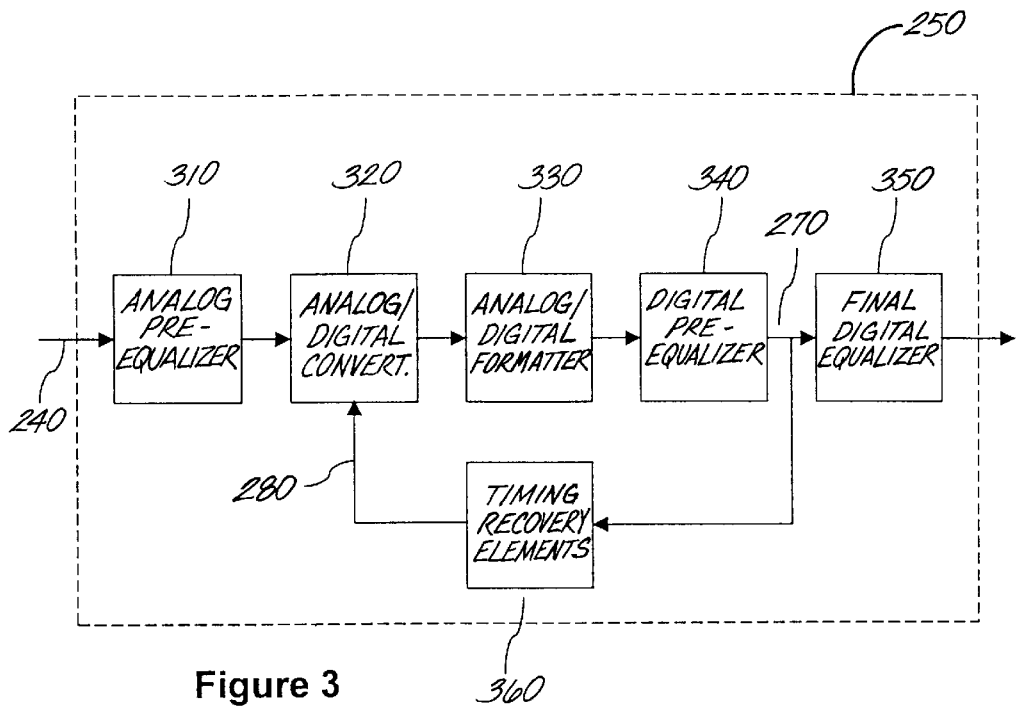
FIG. 3 is a generalized block diagram of signal-adjusting elements of the receiving node according to FIG. 2.

Referring to FIG. 3, in a preferred embodiment of the invention, signal-adjusting elements 250 of receiving node 220 are shown in more detail. Elements 250 are preferably constructed using a complimentary Metal-Oxide-Silicon (CMOS) integrated circuit process, although other processes, such as a bipolar junction transistor (BJT) process, may be used. One of elements 250 is analog pre-equalizer 310. Analog pre-equalizer 310 is a simple, fixed equalizer for increasing the signal-to-quantization noise ratio of data-carrying signal 240 to improve the reliability of downstream digital processing. Analog pre-equalizer 310 preferably subjects signal 240 to a frequency response having a one-zero, one-pole high frequency gain characteristic to provide a rough reshaping of signal 240 into a form which will appear to subsequent processing circuits as if signal 240 had been transmitted over a cable shorter than the actual length of cable 230, although other analog equalizers that improve high frequency signal to quantization noise ratio may be employed. The desired frequency response is determinable from a given set of characteristics known a priori for receiving node 220, such as the cable type with which node 220 is compatible, by reference to a frequency-dependent signal attenuation model such as the model for Category 5 UTP cable shown in FIG. 1. A passive circuit followed by active buffer configuration is contemplated for implementing analog pre-equalizer 310, although an active circuit configuration may be used. In a passive circuit configuration, a combination of judiciously placed resistors and capacitors are contemplated to achieve the desired frequency response. In an active circuit configuration, a differential pair with source degeneration may be used. If desired, analog pre-equalizer 310 may also have or accept means for detecting the approximate length of cable 230 and means for deactivating the passive or active circuit, as the case may be, for cable lengths sufficiently short that analog pre-equalizer 310 is not required for reliable downstream digital processing. Analog pre-equalizer 310 is followed by an analog-digital converter 320, which converts data-carrying signal 240 from analog into digital form. Converter 320 is followed by analog-digital formatter 330, which makes any desired signal format adjustments, such as adjustments to signal polarity and offset, and applies signal 240 to digital pre-equalizer 340. It will be appreciated that analog-digital converter 320 may include functions, such as a "zero offset" function, which may eliminate the need for analog-digital format means 330 or particular functions of means 330.

Figure 4:
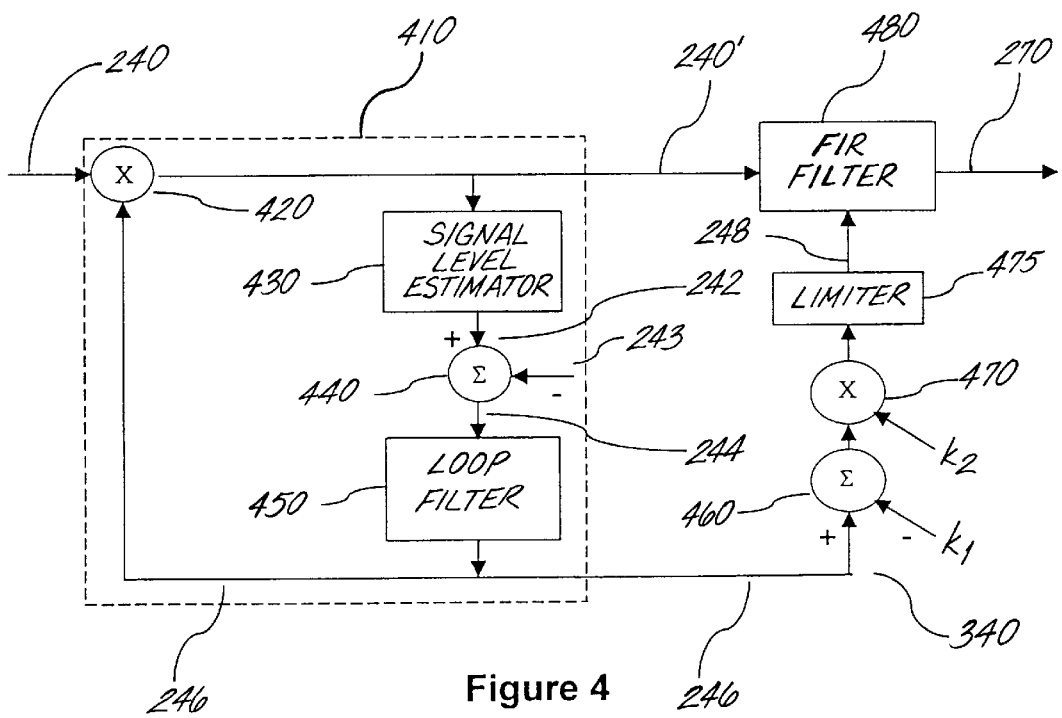
FIG. 4 is a generalized block diagram of a digital pre-equalizer of the signal-adjusting elements according to FIG. 3.
Figure 5:
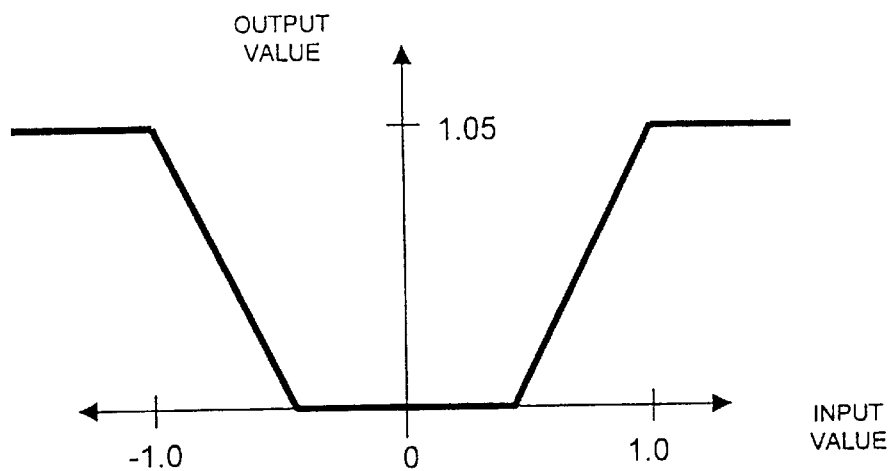
FIG. 5 is a graphical representation of a transfer function implemented by an AGC circuit of the digital pre-equalizer of FIG. 4.
Figure 6:
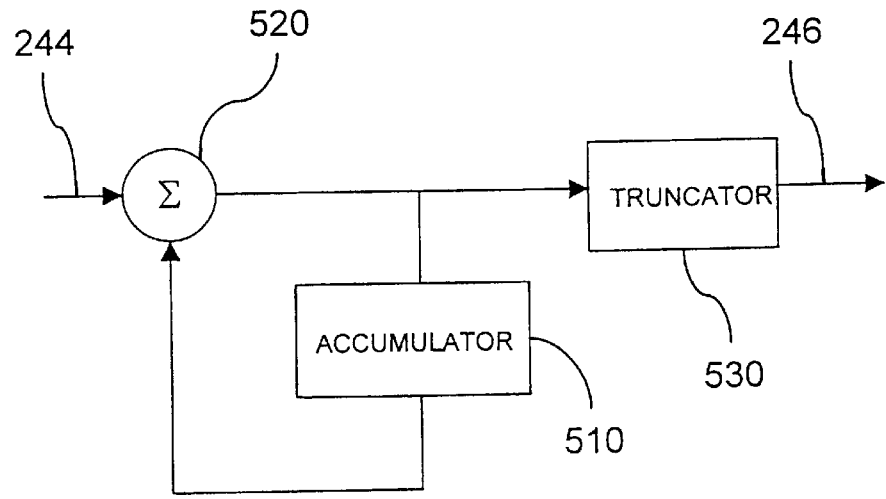
FIG. 6 is a generalized block diagram of a loop filter of the digital pre-equalizer of FIG. 4.

Referring to FIGS. 4 and 5, digital pre-equalizer 340 is shown in greater detail in a preferred embodiment of the invention. Digital pre-equalizer 340 includes AGC circuit 410. Preferably included in AGC circuit 410 are gain block 420, signal level estimator 430, gain error generator 440 and loop filter 450, all of which are preferably implemented as discrete computational logic blocks in custom logic. Gain block 420 is preferably a non-pipelined Booth-encoded multiplier for multiplying data-carrying signal 240 by AGC gain signal 246 to produce a modified or gain-adjusted signal 240'. Estimator 430 samples signal 241 and subjects the samples to a memoriless non-linear transfer function. The non-linear transfer function is a predetermined mathematical mapping between the samples taken as an input and an estimated signal level as an output. The mapping assigns each possible input value of signal 240' a corresponding output value selected discriminately to yield an accurate estimate of the level of signal 240' when the output values are averaged over a sufficiently large number of samples. The desired mapping is determinable from a given set of characteristics known a priori for receiving node 220, such as the cable type, modulation type and symbol type with which node 220 is compatible. Typically, non-linear transfer function is a simple piecewise linear curve, such as the transfer function for MLT-3 transmission over Category 5 UTP cable shown in FIG. 5. Although estimator 430 is preferably implemented as a computational logic block, other configurations, such as a look-up table implemented in a one-dimensional read-only memory (ROM), may also be used. Generator 440 calculates gain error signal 244 as the difference between estimated signal level signal 242 and a target signal level signal 243. Target signal level signal 243 has a constant value which is the optimal signal level which would result if data-carrying signal 240 were transmitted distortion-free from transmitting node 210 to pre-equalizer 340, and is also determinable from characteristics known a priori for receiving node 220, particularly the symbol alphabet with which node 220 is compatible. A target signal level of 0.5 is contemplated for nodes receiving MLT-3 transmissions. Loop filter 450 is preferably a second order filter operative as a low pass accumulator for reducing noise of gain error signal 244 by averaging the current value of signal with earlier values of signal 244 in the generation of AGC gain signal 246. Referring to FIG. 6, loop filter 450 is shown in greater detail. Loop filter 450 preferably includes accumulator 510 and summer 520 implemented in a closed loop with feedback followed by truncator 530, although alternative computational logic block arrangements which achieve the same desired noise-reducing function may be deployed. In a preferred embodiment, the bandwidth of AGC circuit is described by the relationship $$f_{BW} \approx f_S/K$$

where

K=the loop gain;

$f_S$=the symbol rate; and $f_{BW}$=the loop bandwidth.

Operatively adjacent ACG circuit 410 are coefficient generators 460, 470, coefficient limiter 475 and FIR filter 480, each of which is preferably implemented as a computational logic block in custom logic. Coefficient generators 460, 470 perform basic mathematical operations on AGC gain signal 246 to generate coefficient signal 248. Coefficient generators 460, 470 include subtractor 460 and multiplier 470. Subtractor 460 subtracts a constant $k_1$ from AGC gain signal 246 while multiplier 470 multiplies the resultant signal by a constant $k_2$ in the generation of signal 248. Values for constants $k_1$, $k_2$ are chosen discriminately so as to generate a signal having a value suitable for implementation by FIR filter 480 to reshape data-carrying signal 241 into a form approximating the original waveform generated at transmitting node 210. The desired values for constants $k_1$, $k_2$ are estimable by reference to a given set of characteristics known a priori for receiving node 220, such as the cable type, modulation type and alphabet type with which node 220 is compatible. Values of 1.0 and 0.25 have been found particularly advantageous for $k_1$, and $k_2$, respectively, for use in frequency-dependent correction of signals transmitted over Category 5 UTP cable in MLT-3. Coefficient limiter 475 preferably follows coefficient generators 460, 470. Limiter 475 saturates at a particular value of coefficient signal 248 to effect an upper limit on the demands of the multiplier in FIR filter 480. It has been found advantageous to have limiter 475 saturate at a coefficient value of 0.5. FIR filter 480 preferably subjects data-carrying signal 241 to a frequency response calculated based on the value of coefficient signal 248. In a preferred embodiment, the frequency response is a one-tap response described by the equation $$|H(z)|=1-\alpha z^{-1}$$

where α=the value of coefficient signal 248;

z=the complex frequency of data-carrying signal 241 (where $z=e^{-j\omega}$); and

|H(z)|=the frequency-dependent gain.

Figure 7:
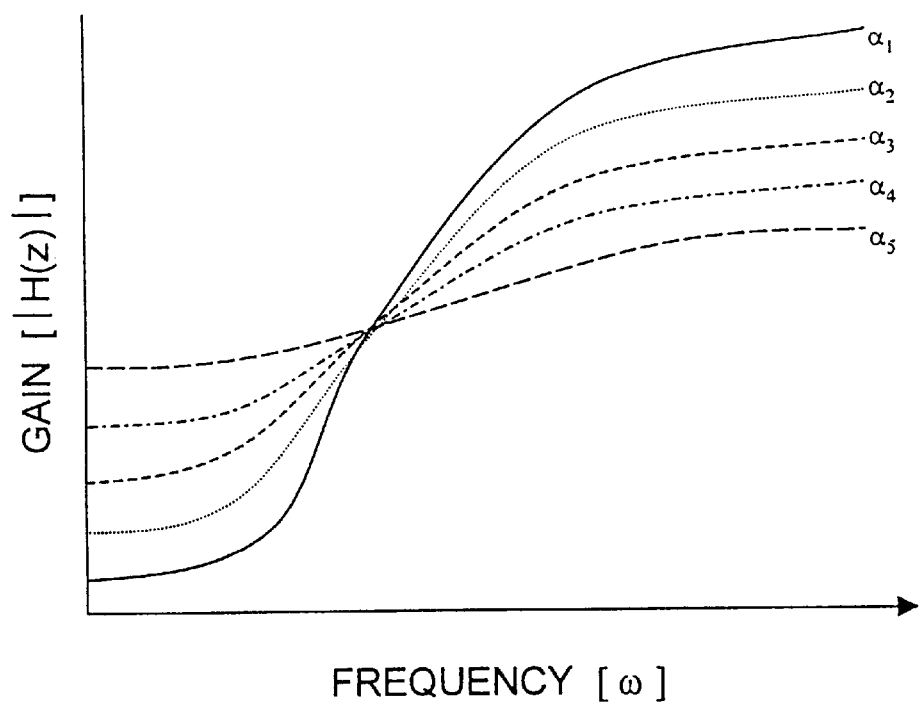
FIG. 7 is a graphical representation of a frequency response of the FIR filter of the digital pre-equalizer of FIG. 4.

The frequency response for various values of coefficient signal 248 are shown graphically in FIG. 7. Although a simple one-tap filter is preferred for FIR filter 280, alternative filters providing a frequency response dependent on the AGC gain signal 246 may be employed. The frequency response results in output signal 270. Returning to FIG. 3, output signal 270 is applied separately to final digital equalizer 350 and timing recovery elements 360, which perform final equalization and recovery of the implicit clock, respectively, using techniques known to the art. In one implementation, final digital equalizer 350 has an adaptive FIR filter which performs a decision-directed adaptation on output signal 270 which directs output signal 270 toward a nominal value using a stochastic gradient algorithm designed to minimize the mean square error of the resulting, final signal, as is known and described in the art. See, e.g., Proakis, Digital Communications, 3d Int'l Ed., pp. 649–76, which is incorporated herein by reference.

In accordance with a preferred embodiment of the invention, in operation, data-carrying signal 240 is generated at transmitting node 210 in undistorted form and transmitted over cable 230 to receiving node 220. Signal 240 is received by analog pre-equalizer 310 in a severely distorted form. Analog pre-equalizer 310, if switched-in, applies a frequency response having a one-zero, one-pole high frequency gain characteristic which roughly reshapes signal 240 into a form which, generally speaking, reduces the effective cable length as seen by subsequent processing elements. Signal 240 passes through converter 320 and analog-digital formatter 330 and arrives at digital pre-equalizer 340. At digital pre-equalizer 340, AGC circuit 410 implements a continuous loop with feedback to effect a frequency-independent gain on signal 240 to bring the amplitude of signal 240 closer to the target signal level. More specifically, estimator 430 samples signal 241 and subjects the samples to a memoriless non-linear transfer function resulting in estimated signal level signal 242. Generator 440 compares estimated signal level signal 242 with target signal level signal 243 resulting in gain error signal 244. Loop filter 450 filters gain error signal 244 to generate AGC gain signal 246. Loop filtering is preferably performed by applying an accumulator to gain error signal 244 and truncating gain error signal 244 in the generation of AGC gain signal 246. AGC gain signal 246 is applied in feedback by gain block 420 to data-carrying signal 240 to produce a modified or gain-adjusted signal 240' and to close the AGC circuit loop. Data-carrying signal 240', as amplified by gain block 420, is fed to FIR filter 480. Coefficient signal 248 dependent on AGC gain signal 246 is applied separately to filter 480. Filter 480 subjects data-carrying signal 241 to a frequency response calculated using coefficient signal 248. Filter 480 returns output signal 270 which, due to the joint tuning, approximates the original signal waveform with close enough proximity to enable timing recovery elements 360 to reliably recover the implicit clock and enable final digital equalizer 350 to reliably perform final equalization. More particularly, timing recovery elements 360 receive output signal 270 and recover and apply the implicit clock to analog-digital converter 320 in the form of clock signal 280, allowing converter 320 to accurately sample signal 240 when performing analog-digital conversion. Output signal 270 is also applied to final digital equalizer 350, which performs final equalization in preparation for data recovery.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

I claim:

1. A digital equalizer, comprising:
    means for estimating the level of a modified data-carrying signal;
    means for generating a frequency-independent gain signal as a function of the estimated level;
    means for generating a frequency-dependent gain as a function of the frequency-independent gain signal;
    means for applying the frequency-independent gain signal to a data-carrying signal; and
    means for separately applying the frequency-dependent gain to the modified data-carrying signal.

2. The digital equalizer according to claim 1, wherein the frequency-independent gain signal is applied to the data-carrying signal in a closed loop and the frequency-dependent gain is applied to the modified data-carrying signal in open-loop.

3. The digital equalizer according to claim 1, wherein the means for generating the frequency-dependent gain comprises:
    means for generating a coefficient signal as a function of the frequency-independent gain signal; and
    means for calculating the frequency-dependent gain as a function of the coefficient signal.

4. The digital equalizer according to claim 3, wherein the frequency-dependent gain is characterized by the equation $$|H(z)|=1-\alpha z^{-1}$$

where $\alpha$=the value of the coefficient signal;
    z=the complex frequency of the data-carrying signal; and
    $|H(z)|$=the frequency-dependent gain.

5. The digital equalizer according to claim 1, wherein the means for generating the frequency-independent gain signal comprises:
    means for generating a gain error signal as the difference between a target signal level and the estimated level; and
    means for filtering the gain error signal.

6. The digital equalizer according to claim 1, further comprising means for transmitting an output data-carrying signal from the equalizer to other processing elements.

7. The digital equalizer according to claim 6, wherein a other processing elements include timing recovery elements.

8. The digital equalizer according to claim 6, wherein the other processing elements include a digital adaptive equalizer.

9. The digital equalizer according to claim 1, wherein the data-carrying signal contains distortions introduced during transmission over UTP cable.

10. The digital equalizer according to claim 9, wherein the UTP cable is Category 5 cable.

11. The digital equalizer according to claim 9, wherein the UTP cable is Category 3 cable.

12. The digital equalizer according to claim 1, wherein the data-carrying signal contains data transmitted in a multi-level symbol alphabet.

13. The digital equalizer according to claim 12, wherein the multi-level symbol alphabet is MLT-3.

14. A method for improving a data-carrying signal distorted by transmission over a channel, the method comprising the steps of:
    estimating the level of a modified data-carrying signal;
    generating a frequency-independent gain signal as a function of the estimated level;
    generating a frequency-dependent gain as a function of the frequency-independent gain signal;
    applying the frequency-independent gain signal to the data-carrying signal; and
    separately applying the frequency-dependent gain to the modified data-carrying signal to produce an output data-carrying signal.

15. The method of claim 14, wherein the frequency-independent gain signal is applied to the data-carrying signal in a closed loop and the frequency-dependent gain is applied to the modified data-carrying signal in open-loop.

16. The method of claim 14, wherein the step of generating the frequency-dependent gain comprises the steps of:
    generating a coefficient signal as a function of the frequency-independent gain signal; and
    calculating the frequency-dependent gain as a function of the coefficient signal.

17. The method of claim 16, wherein the step of calculating the frequency-dependent gain comprises the step of characterizing the frequency-dependent gain using the equation $$|H(z)|=1-\alpha z^{-1}$$

where $\alpha$=the value of the coefficient signal;
    z=the complex frequency of the data-carrying signal; and
    $|H(z)|$=the frequency-dependent gain.

18. The method of claim 14, wherein the step of generating the frequency-independent gain signal comprises the steps of:
    generating a gain error signal as the difference between a target signal level and the estimated level; and
    filtering the gain error signal.

19. The method of claim 14 further comprising the step of transmitting the output data-carrying signal from the equalizer to other processing elements.

20. The method of claim 19, wherein the step of transmitting the output data-carrying signal from the equalizer to other processing elements comprises transmitting the output data-carrying signal from the equalizer to timing recovery elements.

21. The method of claim 19, wherein the step of transmitting the output data-carrying signal from the equalizer to other processing elements comprises transmitting the data-carrying signal from the equalizer to a digital adaptive equalizer.

22. The method of claim 14 wherein the distortion to the data-carrying signal is introduced during transmission of the signal over UTP cable.

23. The method of claims 22, wherein the UTP cable is Category 5 cable.

24. The method of claim 22, wherein the UTP cable is Category 3 cable.

25. The method of claim 14, wherein the data-carrying signal contains data transmitted in a multi-level symbol alphabet.

26. The method of claim 25, wherein the multi-level symbol alphabet is MLT-3.

* * * * *